(12) United States Patent
Endo et al.

(10) Patent No.: US 8,375,562 B2
(45) Date of Patent: Feb. 19, 2013

(54) MANUFACTURING METHOD OF ROTATING ELECTRIC MACHINE AND ROTATING ELECTRIC MACHINE

(75) Inventors: Yasuhiro Endo, Okazaki (JP); Eiji Yamada, Owariasahi (JP); Yasushi Nishikuma, Toyota (JP); Kohei Yoshikawa, Osaka (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 419 days.

(21) Appl. No.: 12/739,349

(22) PCT Filed: Oct. 21, 2008

(86) PCT No.: PCT/JP2008/069010
§ 371 (c)(1),
(2), (4) Date: Apr. 22, 2010

(87) PCT Pub. No.: WO2009/054365
PCT Pub. Date: Apr. 30, 2009

(65) Prior Publication Data
US 2010/0231086 A1    Sep. 16, 2010

(30) Foreign Application Priority Data
Oct. 25, 2007  (JP) .................................. 2007-277987

(51) Int. Cl.
H02K 15/10 (2006.01)
H02K 15/02 (2006.01)
B23P 19/04 (2006.01)
(52) U.S. Cl. .......................................................... 29/596
(58) Field of Classification Search .................... 29/596, 29/598; 31/254.1
See application file for complete search history.

(56) References Cited

U.S. PATENT DOCUMENTS

| 7,143,506 B2* | 12/2006 | Ooiwa ............................ 29/606 |
| 2001/0004799 A1 | 6/2001 | Suzuki |
| 2002/0036438 A1* | 3/2002 | Nishiyama et al. ........... 310/168 |
| 2006/0113849 A1* | 6/2006 | Enomoto et al. ................ 310/44 |
| 2011/0302769 A1* | 12/2011 | Saito et al. ....................... 29/596 |

FOREIGN PATENT DOCUMENTS

| JP | 8-033287 A | 2/1996 |
| JP | 9-233773 A | 9/1997 |
| JP | 9-308141 A | 11/1997 |
| JP | 9-322493 A | 12/1997 |

(Continued)

OTHER PUBLICATIONS

Machine translation of JP11308820, Mashita et al., May 1999.*
International Search Report for PCT/JP2008/069010, dated Jan. 6, 2009, 4 pages.
Written Opinion of the International Searching Authority for International Application No. PCT/JP2008/069010, issued Dec. 17, 2008, 8 pages.

(Continued)

Primary Examiner — Quyen Leung
Assistant Examiner — Terrance Kenerly
(74) Attorney, Agent, or Firm — Sughrue Mion, PLLC

(57) ABSTRACT

A manufacturing method of a rotating electric machine includes the steps of: preparing a plurality of split stator cores annularly arranged at intervals in a circumferential direction so that their inner end portions are aligned with an imaginary circle and a support member positioned inside the imaginary circle in a radial direction to support the inner end portions of split stator cores; mounting a fastening member on outer peripheries of split stator cores to press respective split stator cores inward in the radial direction; and displacing split stator cores pressed by fastening member inward in the radial direction while the support member is supporting split stator cores.

4 Claims, 13 Drawing Sheets

FOREIGN PATENT DOCUMENTS

| | | |
|---|---|---|
| JP | 11-308820 A | 11/1999 |
| JP | 2001-218429 A | 8/2001 |
| JP | 2005-322800 A | 11/2005 |
| JP | 2006-304460 A | 11/2006 |
| JP | 2007-202327 A | 8/2007 |

OTHER PUBLICATIONS

International Preliminary Report on Patentability for International Application No. PCT/JP2008/069010, issued Feb. 2, 2010, 6 pages.

* cited by examiner

MANUFACTURING METHOD OF ROTATING ELECTRIC MACHINE AND ROTATING ELECTRIC MACHINE

TECHNICAL FIELD

The present invention relates to a manufacturing method of a rotating electric machine and the rotating electric machine and particularly to a manufacturing method of a rotating electric machine having a plurality of split stator cores and the rotating electric machine.

BACKGROUND ART

There are various types of conventionally proposed manufacturing methods for obtaining accuracy of an inner diameter of a stator in manufacturing methods of a rotating electric machine having a plurality of split stator cores.

For example, in a manufacturing method of a rotating electric machine described in Japanese Patent Laying-Open No. 2001-218429, stress is uniformly applied to a stator core in a direction from an outer periphery toward an inner periphery to fix the core after locking slot open portions of stator teeth with equal pitch.

Japanese Patent Laying-Open No. 9-322493 describes a stator positioning jig for positioning a split stator main body for a rotating electric machine and a manufacturing method for manufacturing the split stator main body for the rotating electric machine by using the stator positioning jig.

The stator positioning jig includes a columnar inner diameter reference mandrel, stator positioning pins disposed annularly around the inner diameter reference mandrel for positioning respective unit cores, and a diameter reducing jig for pressing the unit cores mounted on the stator positioning pins toward the inner diameter reference mandrel. The stator positioning pins are inserted into stator positioning holes formed in the unit cores. Then, the diameter reducing jig is disposed to reduce a diameter of the respective unit cores. As a result, the respective unit cores hit against an outer periphery of the inner diameter reference mandrel to form the split stator main body for the rotating electric machine and with high roundness.

There is a stator manufactured by welding yoke portions of split cores as described in Japanese Patent Laying-Open No. 2006-304460.

Patent Document 1: Japanese Patent Laying-Open No. 2001-218429
Patent Document 2: Japanese Patent Laying-Open No. 9-322493
Patent Document 3: Japanese Patent Laying-Open No. 2006-304460

DISCLOSURE OF THE INVENTION

Problems to be Solved by the Invention

In the manufacturing method described in Japanese Patent Laying-Open No. 2001-218429, however, the adjacent stator cores are likely to come in contact with each other and become dislocated in locking of the respective stator cores with equal pitch. Therefore, it is difficult to appropriately lock the respective stator cores. As a result, any of the stator cores are dislocated and it is difficult to obtain inner diameter roundness.

In the manufacturing method of the split stator main body for the rotating electric machine described in Japanese Patent Laying-Open No. 9-322493, the adjacent unit cores come in contact with each other when the respective unit cores are displaced radially inward. Therefore, it is difficult for the respective unit cores to be displaced uniformly and radially inward. As a result, it is difficult to obtain the inner diameter roundness of the resultant split stator main body for the rotating electric machine.

Similarly, in Japanese Patent Laying-Open No. 2006-304460, it is difficult to obtain the inner diameter roundness of the stator in some cases depending on welding conditions and the like.

The present invention has been made with the above problems in view and it is an object of the invention to provide a rotating electric machine manufacturing method capable of obtaining inner diameter roundness of a stator and a rotating electric machine having the inner diameter roundness of the stator.

Means for Solving the Problems

A manufacturing method of a rotating electric machine according to the present invention includes the steps of: preparing a plurality of split stator cores annularly arranged at intervals in a circumferential direction so that inner end portions thereof are aligned with an imaginary circle and a support member positioned inside the imaginary circle in a radial direction to support the inner end portions of the split stator cores; mounting a fastening member on outer peripheries of the split stator cores to press the respective split stator cores inward in the radial direction; and displacing the split stator cores pressed by the fastening member inward in the radial direction while the support member is supporting the split stator cores.

Preferably, the support member supports portions of the inner end portions including at least first areas and second areas positioned away from each other in a direction of a central axis of the imaginary circle.

Preferably, the support member includes a first elastic member and a second elastic member. The first elastic member curves to bulge toward a radial outside of the imaginary circle to thereby be able to support the portion of each of the inner end portions where the first area is positioned. The second elastic member curves to bulge toward the radial outside of the imaginary circle to thereby be able to support the portion of each of the inner end portion where the second area is positioned. The first elastic member and the second elastic member are deformed in such a manner that bulging amounts toward the radial outside of the imaginary circle reduce so that the split stator cores are displaced toward a radial inside of the imaginary circle while the support member is supporting the split stator cores.

Preferably, an inner face of the support member in the radial direction is formed as a first inclined face inclined to be away from the central axis of the imaginary circle as the inner face extends from a first end portion side to a second end portion side of the support member positioned in the direction of the central axis. The first inclined face of the support member is supported by a movable member provided to be movable in the direction of the central axis of the imaginary circle. An outer face of the movable member in the radial direction is formed as a second inclined face for coming in contact with the first inclined face and extending along the first inclined face. The movable member is displaced in a direction from the first end portion to the second end portion so that the split stator cores are displaced toward the radial inside of the imaginary circle while the support member is supporting the split stator cores.

Preferably, the fastening member is an annular member mounted on the outer peripheries of the split stator cores by shrink fitting or press fitting. Preferably, the split stator cores are made up of powder magnetic cores. A rotating electric machine according to the present invention includes an annular stator formed by displacing a plurality of split stator cores annularly arranged on an imaginary circle at intervals in a circumferential direction toward a radial inside of the imaginary circle by fitting a fastening member over outer peripheries of the split stator cores while supporting the split stator cores from radially inside the imaginary circle and a rotor rotatably provided inside the annular stator.

Effects of the Invention

By the manufacturing method of the rotating electric machine according to the present invention, it is possible to obtain inner diameter roundness of a stator. In the rotating electric machine according to the present invention, it is possible to suppress generation of pulsation of torque and vibrations in driving of the rotating electric machine.

DESCRIPTION OF THE REFERENCE SIGNS 100 rotating electric machine, 110 rotation shaft, 120 rotor, 121 rotor core, 122 permanent magnet, 124 resin, 126 magnet insertion hole, 130 stator, 131 stator core, 132 coil, 140 split stator core, 141 stator teeth, 142 yoke portion, 145 fastening member, 146 end face, 147 side face, 200 metal mold, 201 inner diameter support member, 202 pressing member, 203 connecting portion, 204 displacement member, 205 support, 206 groove portion, 207 recessed portion, 211 support end face, 212 inclined face, 213 pressing face

BEST MODES FOR CARRYING OUT THE INVENTION

With reference to FIGS. 1 to 16, a rotating electric machine manufacturing method and a rotating electric machine according to embodiments of the present invention will be described. The numbers and amounts mentioned in the embodiments described below do not limit the scope of the invention unless otherwise specified. Respective components in the following embodiments are not necessarily indispensable for the present invention unless otherwise specified. If there are a plurality of embodiments below, characterizing portions of the respective embodiments are planned to be combined properly from the beginning unless otherwise specified.

First Embodiment

Figure 1:
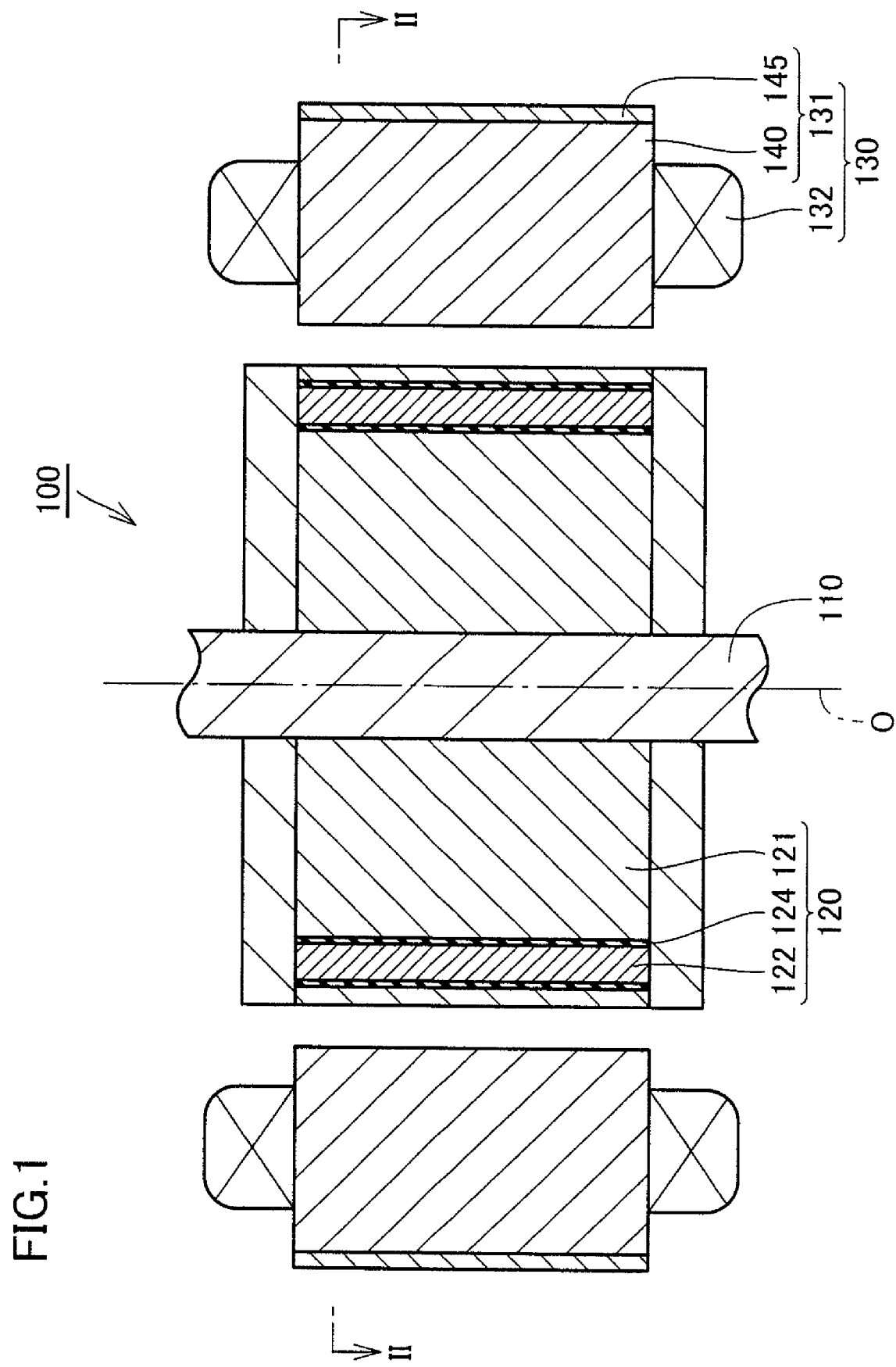
FIG. 1 is a sectional view of a rotating electric machine according to a first embodiment of the present invention.

FIG. 1 is a sectional view of a rotating electric machine 100 according to a first embodiment of the present invention. As shown in FIG. 1, rotating electric machine 100 includes a rotation shaft 110 supported to be rotatable about a rotation center line O, a rotor 120 secured to rotation shaft 110 to be rotatable about rotation center line O, and an annular stator 130 provided around rotor 120.

Rotor 120 is provided with a rotor core 121 formed in a cylindrical shape around rotation center line O and a permanent magnet 122 inserted into a magnet insertion hole 126 formed in rotor core 121 and extending in a direction of rotation center line O. Permanent magnet 122 is fixed by a resin 124 filled into magnet insertion hole 126.

Figure 2:
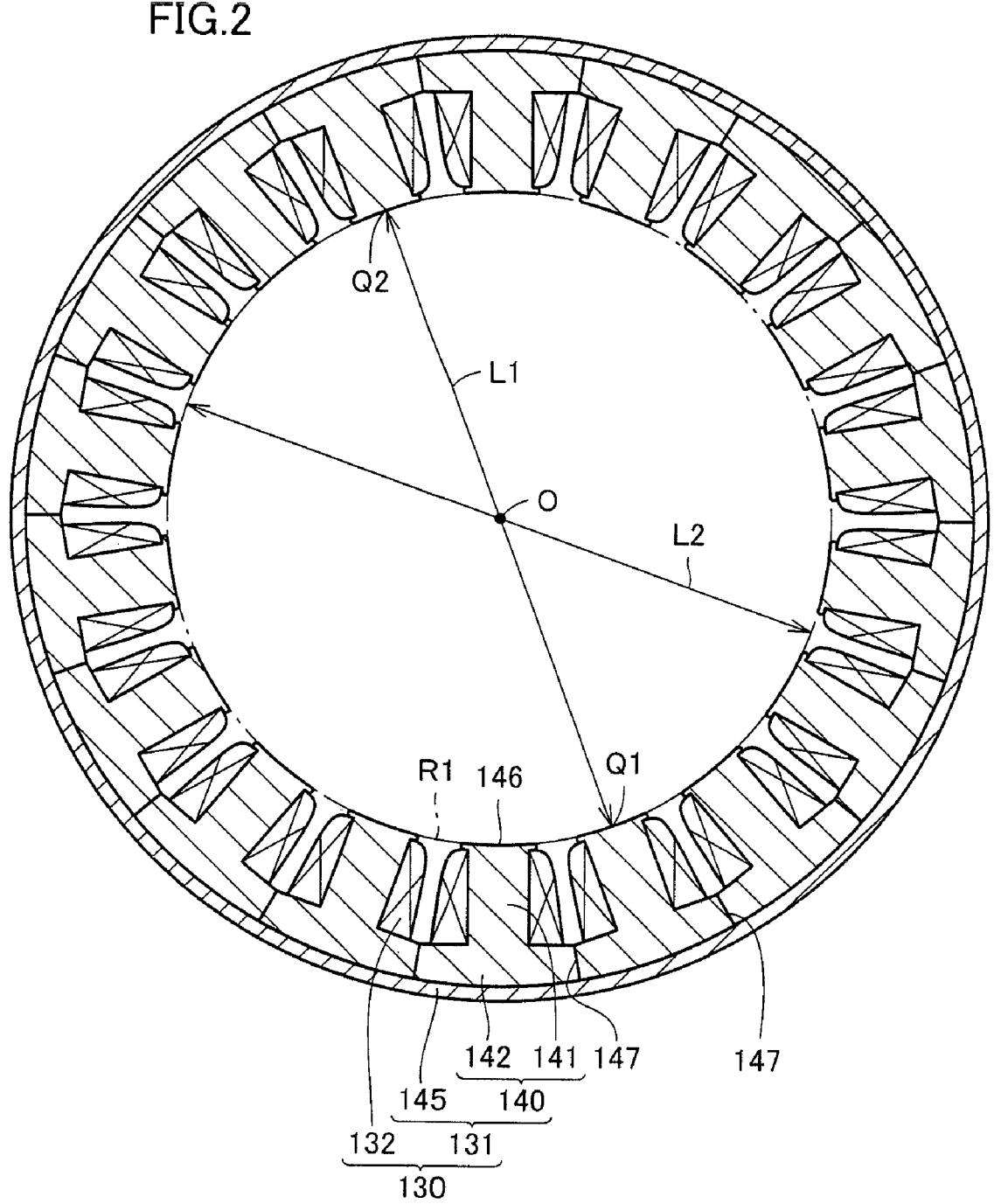
FIG. 2 is a sectional view of a stator along line II-II in FIG. 1.

FIG. 2 is a sectional view of stator 130 along line II-II in FIG. 1. As shown in FIG. 2, stator 130 is formed in an annular shape around rotation center line O. Stator 130 includes a stator core 131 formed in an annular shape and coils 132 wound around stator core 131. Stator core 131 includes a plurality of split stator cores 140 disposed annularly and a fastening member 145 provided on an outer periphery side of split stator cores 140 disposed annularly to annularly fix split stator cores 140.

Each of split stator cores 140 includes a yoke portion 142 extending in a circumferential direction of stator 130 and a stator tooth 141 protruding inward in a radial direction of stator 130 from yoke portion 142. Split stator core 140 is made up of a powder magnetic core. Therefore, a resistance to magnetic flux in stator 130 is reduced and a resistance of magnetic flux in the direction of rotation center line O and a resistance in the circumferential direction of stator 130 are substantially equal. Although respective split stator cores 140 are made up of the powder magnetic cores in the first embodiment, they are not limited to the powder magnetic cores but may be formed by laminating a plurality of magnetic steel sheets, for example.

Coil 132 is wound around stator tooth 141. An end face 146 of each stator tooth 141 positioned inside in the radial direction of stator 130 is a curved face extending in the circumferential direction of stator 130.

In a plan view from the direction of rotation center line O, end face 146 of each stator tooth 141 is substantially positioned on an imaginary circle R1 around rotation center line O. Side faces 147 of respective yoke portions 142 are arranged in the circumferential direction of stator 130 and side faces 147 of adjacent split stator cores 140 are in contact with each other. Respective side faces 147 are extending in the radial direction of stator 130 and arranged on the imaginary circle around rotation center line O.

Respective split stator cores 140 are in contact with each other at side faces 147 of yoke portions 142 positioned in the circumferential direction and are fixed annularly by fastening member 145 pressing respective split stator cores 140 radially inward. Split stator cores 140 adjacent to each other in the circumferential direction are pressed against each other at side faces 147 of yoke portions 142 but are not in contact with each other at other portions.

As described above, because inner diameter roundness of stator 130 is obtained in rotating electric machine 100 according to the first embodiment, it is possible to suppress variations in attracting forces attracting rotor 120 among circumferential positions of stator 130. Therefore, vibrations of rotor 120 and pulsation of torque during driving of rotating electric machine 100 can be suppressed.

In rotating electric machine 100 according to the first embodiment, end faces 146 are standing substantially parallel to the direction of rotation center line O. Therefore, respective end faces 146 are disposed on an imaginary cylindrical face passing through imaginary circle R1 and extending in the direction of rotation center line O. Because cylindricity of rotating electric machine 100 is obtained in this manner, the variations in the direction of rotation center line O can be suppressed in the attracting forces attracting rotor 120 to stator 130 and the vibrations of rotor 120 during driving of rotating electric machine 100 can be suppressed.

With reference to FIGS. 3 to 9, the manufacturing method of rotating electric machine 100 according to the first embodiment will be described.

Figure 3:
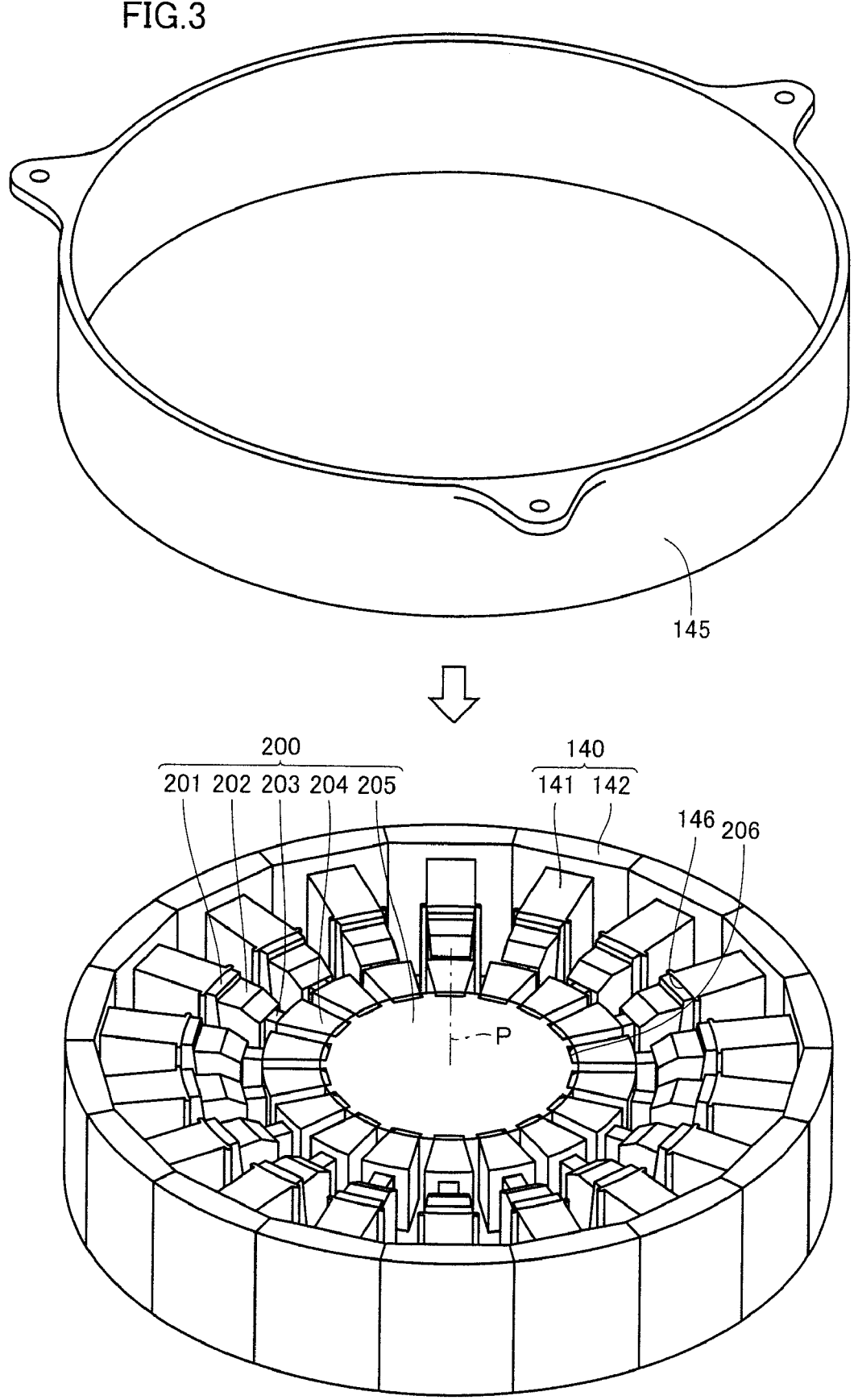
FIG. 3 is a perspective view schematically showing a metal mold used in annularly mounting respective split stator cores, the split stator cores disposed annularly, and a fastening member.
Figure 4:
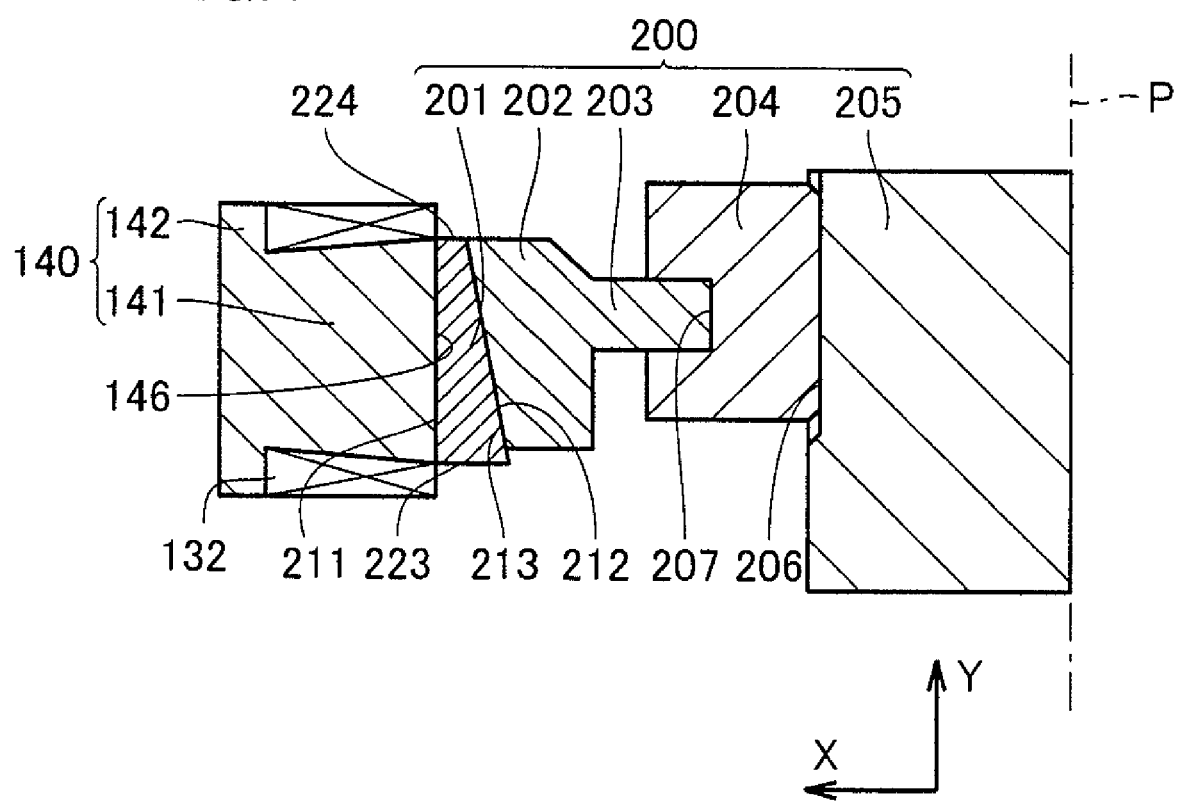
FIG. 4 is a sectional view showing a first step of a stator manufacturing process.
Figure 5:
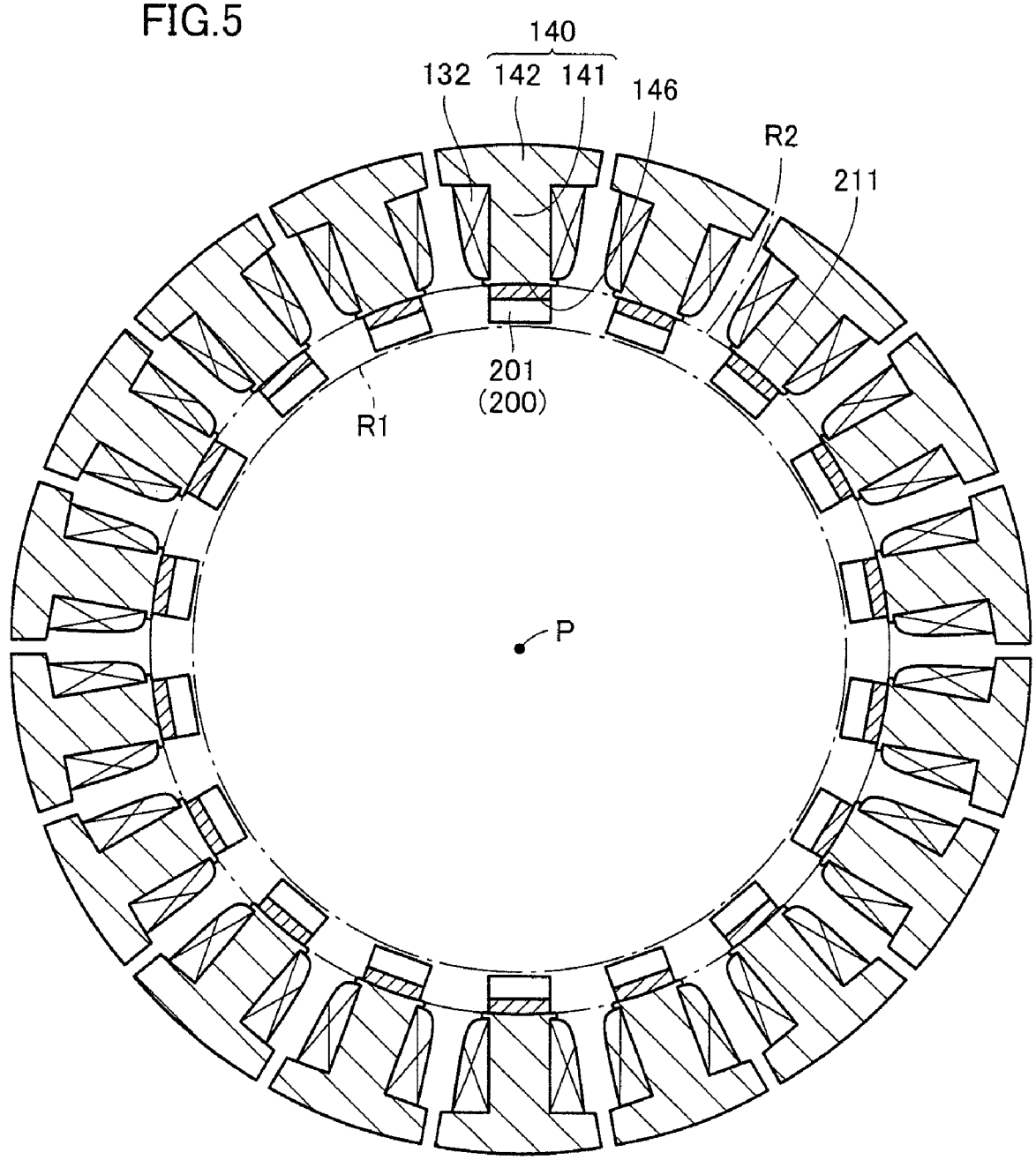
FIG. 5 is a plan view, from a direction of a rotation center line O, of the split stator cores in the first step of the manufacturing process of the stator.

FIG. 3 is a perspective view schematically showing a metal mold 200 used in annularly mounting respective split stator cores 140, split stator cores 140 disposed annularly, and fastening member 145. FIG. 4 is a sectional view showing a first step of a manufacturing process of stator 130. FIG. 5 is a plan view, from the direction of rotation center line O, of split stator cores 140 in the first step of the manufacturing process of stator 130.

As shown in FIGS. 3 and 4, metal mold 200 includes inner diameter support members 201 for supporting end faces 146 positioned radially inside stator teeth 141, pressing members 202 disposed inside inner diameter support members 201 in the radial direction of stator 130, displacement members 204 disposed radially inside pressing members 202, and a columnar support 205 disposed radially inside displacement members 204.

In a peripheral face of support 205, groove portions 206 formed at intervals in a circumferential direction of support 205 and extending in an axial direction of support 205 are formed.

Portions of displacement members 204 are fitted in groove portions 206 and displacement members 204 can be displaced in a direction of a central axis P of support 205. Multiple displacement members 204 are annularly provided at intervals in the circumferential direction of support 205 on the peripheral face of support 205. Although multiple displacement members 204 are provided at intervals in the circumferential direction in the example shown in FIG. 3, displacement members 204 are not limited thereto and may be, for example, an integral annular member.

A recessed portion 207 is formed in a peripheral face positioned radially outside in a direction of arrangement of displacement member 204 out of surfaces of each displacement member 204 and connecting portion 203 of pressing member 202 is fitted in recessed portion 207.

Therefore, if displacement member 204 is displaced along the direction of central axis P of support 205, pressing member 202 can be displaced as well along the direction of central axis P of support 205. Pressing members 202 are provided for respective displacement members 204 and are annularly disposed at intervals.

A radially outer peripheral face out of surfaces of each pressing member 202 is formed as a pressing face 213 pressing inner diameter support member 201 toward split stator core 140. Pressing face 213 is inclined in a direction intersecting the direction of central axis P.

Specifically, pressing face 213 is inclined away from support 205 and increased in diameter as it extends in a direction of an arrow Y (one direction in the direction of central axis P) shown in FIG. 4.

Inner diameter support member 201 is in contact with pressing member 202 and a radially inner peripheral face of inner diameter support member 201 is an inclined face 212 inclined to correspond to the inclination of pressing face 213. Inclined face 212 is inclined away from support 205 and increased in diameter as it extends in the direction of arrow Y. Specifically, inclined face 212 is inclined away from central axis P in a direction from a first axial end face 223 toward a second axial end face 224 arranged in the direction of central axis P out of surfaces of inner diameter support member 201.

A radially outer peripheral face of inner diameter support member 201 is formed as a support end face 211 coming in contact with substantially entire end face 146 of stator tooth 141 to support split stator core 140.

A shape of support end face 211 corresponds to end face 146 and is a curved face around central axis P.

To manufacture stator 130 by using such metal mold 200, coil 132 is first mounted on stator tooth 141 of each split stator core 140 as shown in FIG. 5. Then, respective split stator cores 140 are arranged so that end faces 146 of respective stator teeth 141 are arranged on an imaginary circle R2 around central axis P. Imaginary circle R2 is an imaginary circle having a larger diameter than imaginary circle R1.

In metal mold 300, inner diameter support members 201 are annularly arranged so that support end faces 211 of inner diameter support members 201 are positioned slightly inside imaginary circle R2 in the radial direction and radially outside imaginary circle R1. Then, split stator cores 140 are displaced toward support end faces 211 so that support end faces 211 of inner diameter support members 201 and end faces 146 of split stator cores 140 come in contact with each other or inner diameter support members 201 are displaced so that support end faces 211 come in contact with end faces 146. In this manner, end faces 146 of respective split stator cores 140 are arranged on imaginary circle R2, intervals are formed between split stator cores 140 adjacent to each other in the circumferential direction, and split stator core 140 are arranged at equal intervals.

Support end faces 211 of inner diameter support members 201 are supporting substantially entire faces of end faces 146 of stator teeth 141.

Figure 6:
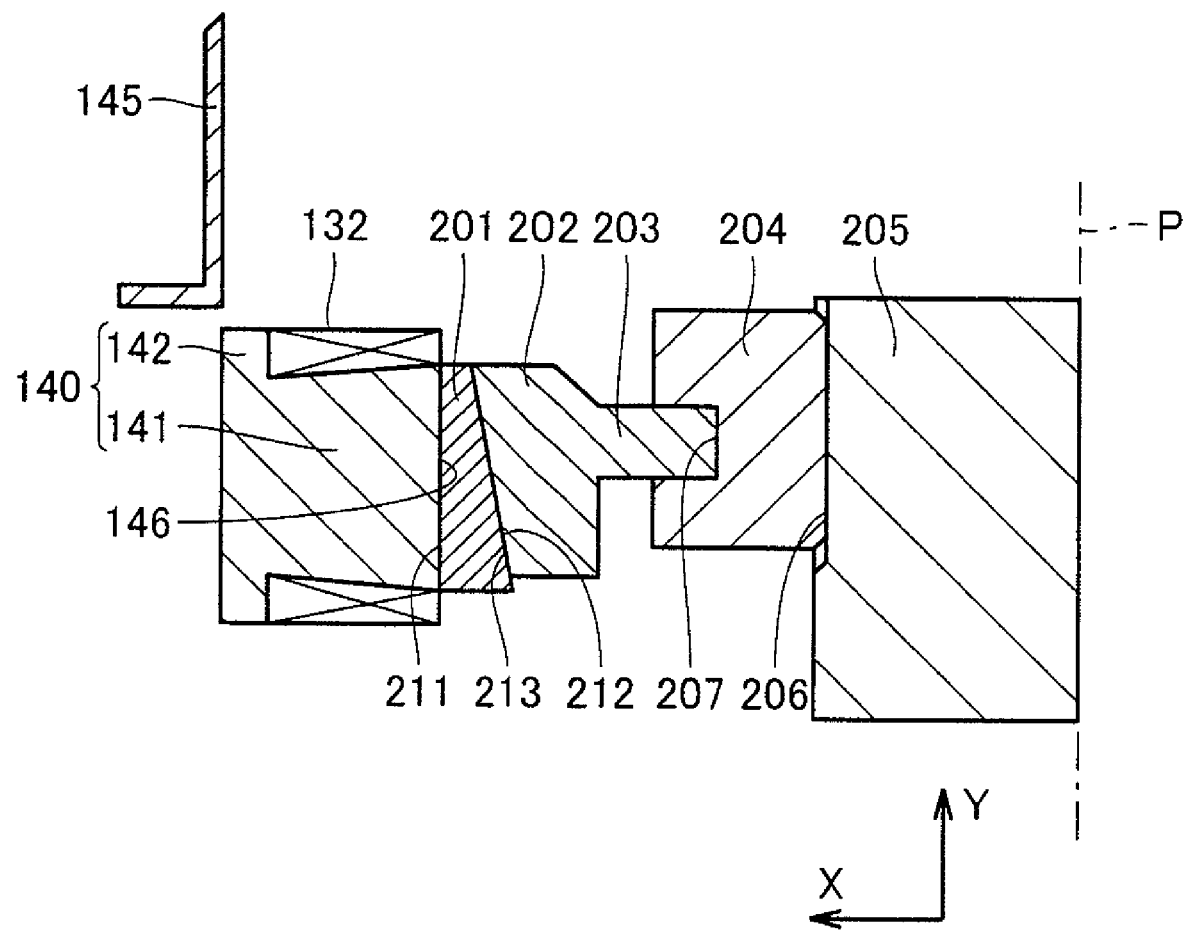
FIG. 6 is a sectional view showing a second step of the manufacturing process of the stator after the step shown in FIGS. 4 and 5.
Figure 7:
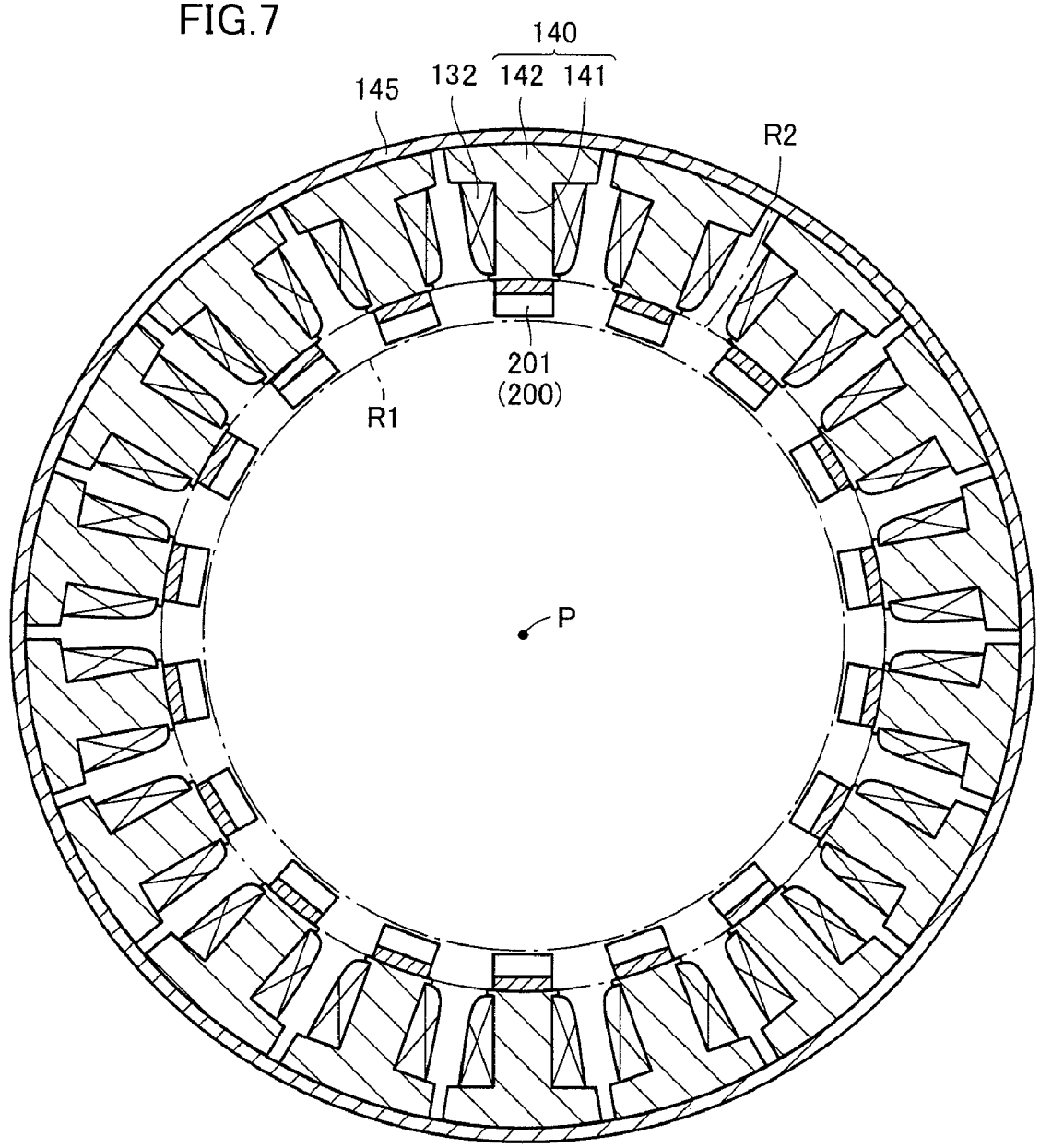
FIG. 7 is a plan view from a direction of a central axis P and showing the second step of the manufacturing process of the stator.

FIG. 6 is a sectional view showing a second step of the manufacturing process of stator 130 after the step shown in FIGS. 4 and 5. FIG. 7 is a plan view from the direction of central axis P and showing the second step of the manufacturing process of stator 130.

As shown in FIGS. 6 and 7, cylindrical (annular) fastening member 145 is mounted by shrink fitting or press fitting on outer peripheral faces of split stator cores 140 supported by inner diameter support member 201 and disposed at equal intervals in the circumferential direction. By mounting fastening member 145 on the outer periphery side of split stator cores 140 in this manner, respective split stator cores 140 are uniformly pressed radially inward by fastening member 145.

Figure 8:
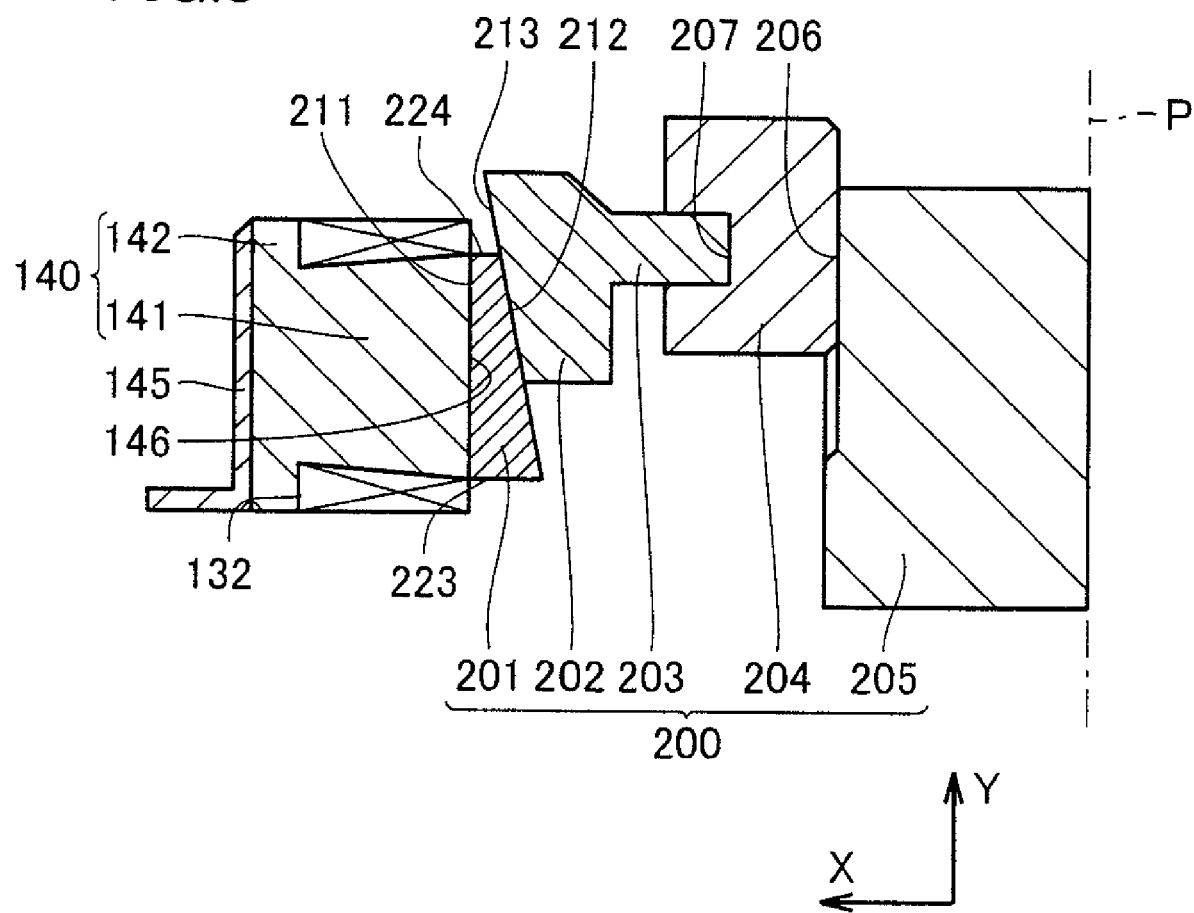
FIG. 8 is a sectional view showing a third step of the manufacturing process of the stator after the step shown in FIGS. 6 and 7.
Figure 9:
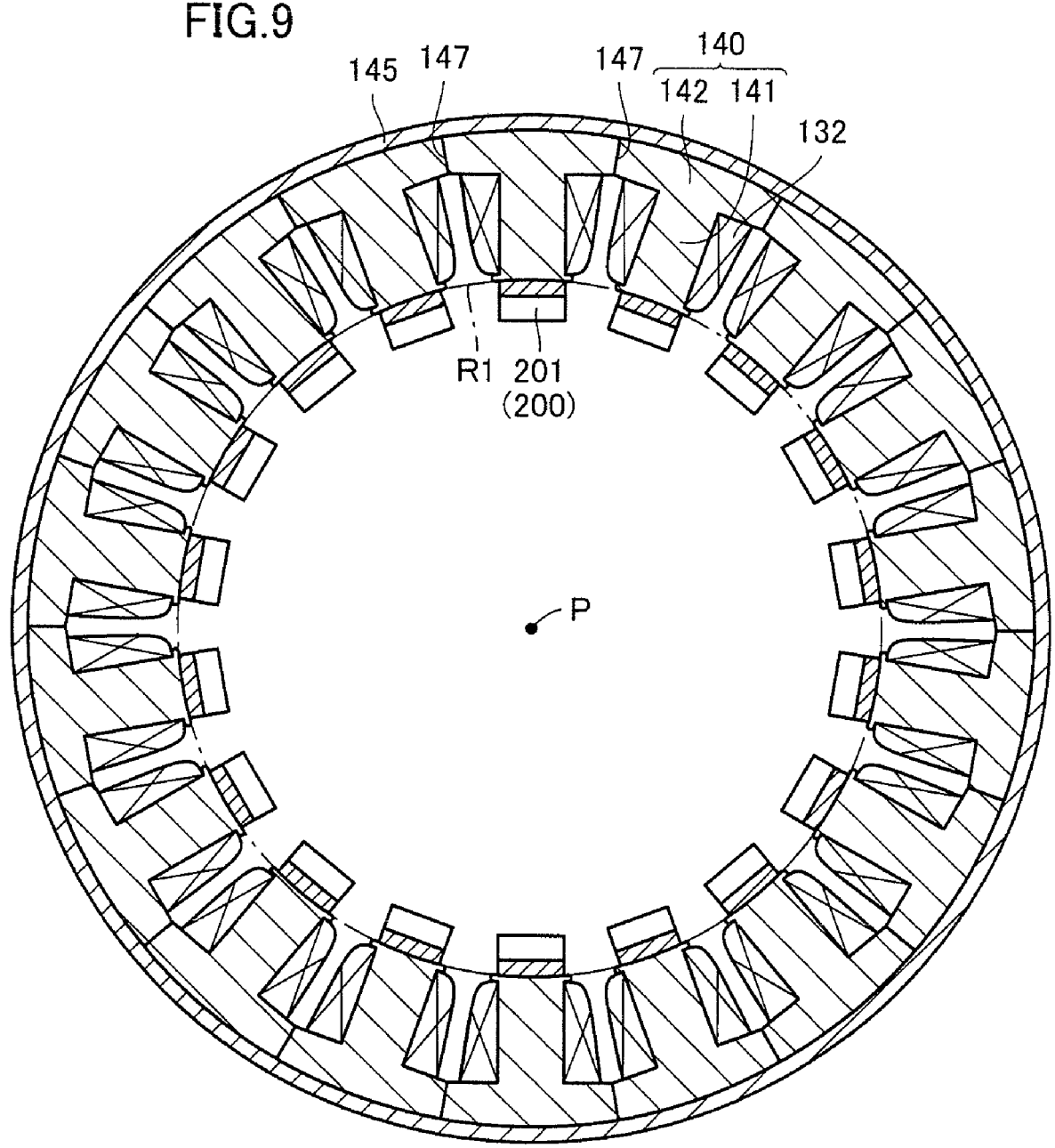
FIG. 9 is a plan view from a direction of a central axis P and showing the third step of the manufacturing process of the stator.

FIG. 8 is a sectional view showing a third step of the manufacturing process of stator 130 after the step shown in FIGS. 6 and 7. FIG. 9 is a plan view from the direction of central axis P and showing the third step of the manufacturing process of stator 130.

In FIG. 8, displacement members 204 are displaced in the direction of arrow Y (direction from axial end face 223 toward axial end face 224) along groove portions 206. As a result, pressing members 202 connected to displacement members 204 are also displaced in the direction of arrow Y.

In this case, each pressing face 213 is inclined radially inward as it extends in an opposite direction (direction from axial end face 224 toward axial end face 223) to the direction of arrow Y. On the other hand, each split stator core 140 is pressed radially inward by fastening member 145. Therefore, as displacement member 204 moves in the direction of arrow Y, each split stator core 140 is displaced radially inward.

Then, as shown in FIGS. 7 and 9, end faces 146 of respective stator teeth 141 are displaced from imaginary circle R2 toward imaginary circle R1. At this time, end faces 146 of respective split stator cores 140 are supported by inner diameter support members 201.

In this case, when split stator cores 140 start to be displaced radially inward, split stator cores 140 are away from each other. Inclination angles of inclined faces 212 of respective inner diameter support members 201 and inclination angles of pressing faces 213 of respective pressing members 202 are equal to each other. Therefore, respective split stator cores 140 are displaced radially inward at substantially the same speed and the intervals between respective split stator cores 140 are uniformly narrowed.

In this case, split stator cores 140 adjacent to each other in the circumferential direction are the closest to each other at side faces 147 of yoke portions 142. When end faces 146 of respective split stator cores 140 reach imaginary circle R1, side faces 147 of split stator cores 140 adjacent to each other in the circumferential direction come in contact with each other.

In other words, when respective split stator cores 140 are displaced radially inward toward imaginary circle R2, contact between portions other than side faces 147 is suppressed. When side faces 147 come in contact with each other, respective end faces 146 reach imaginary circle R1 and respective split stator cores 140 are pressed against and fixed to each other.

Because contact between split stator cores 140 is suppressed when respective split stator cores 140 are displaced radially inward as described above, it is possible to suppress inclination or dislocation of any split stator cores 140 due to the contact between split stator cores 140.

As a result, obstruction of advance of split stator cores 140 positioned around dislocated split stator core 140 by dislocated split stator core 140 can be suppressed and respective split stator cores 140 can be displaced substantially uniformly in the radially inward direction.

Furthermore, because end faces 146 from one end portions to the other end portions positioned in the direction of central axis P are supported by support end faces 211 of inner diameter support members 201, inclination of end faces 146 with respect to central axis P is suppressed.

Thereafter, side faces 147 of yoke portions 142 arranged in the circumferential direction come in contact with each other and are pressed against each other by a pressing force by fastening member 145 and split stator cores 140 are fixed in an annularly arranged state.

Then, inner diameter support members 201 move away from end faces 146 of stator teeth 141 and formed stator 130 is taken out of metal mold 200. In this manner, it is possible to manufacture stator 130 with inner diameter roundness and cylindricity. By fixing stator 130 obtained in this manner in a case and disposing rotor 120 secured to rotation shaft 110 in stator 130, rotating electric machine 100 is formed.

Figure 10:
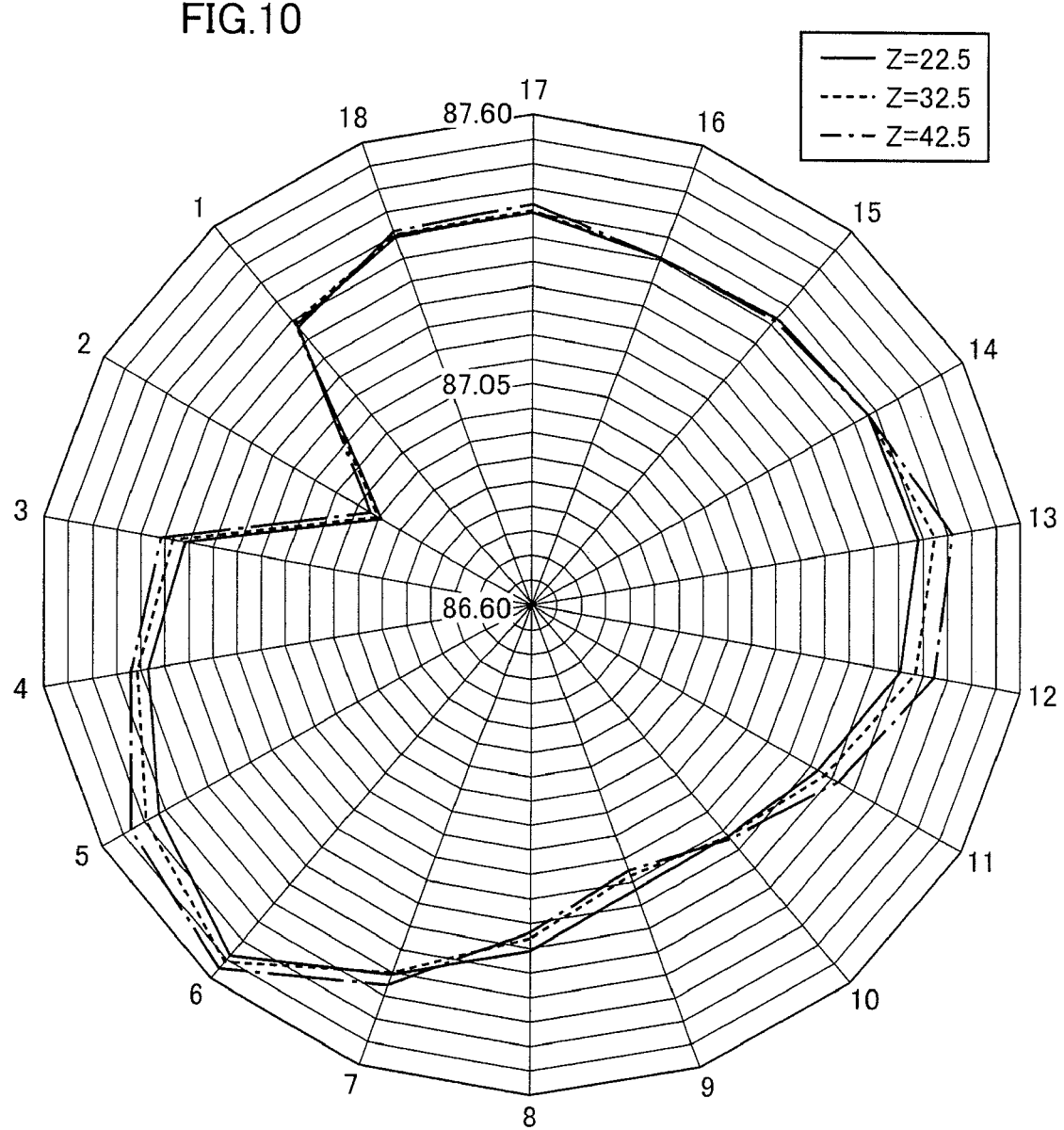
FIG. 10 is a graph showing inner diameter accuracy in a stator of a comparative example.
Figure 11:
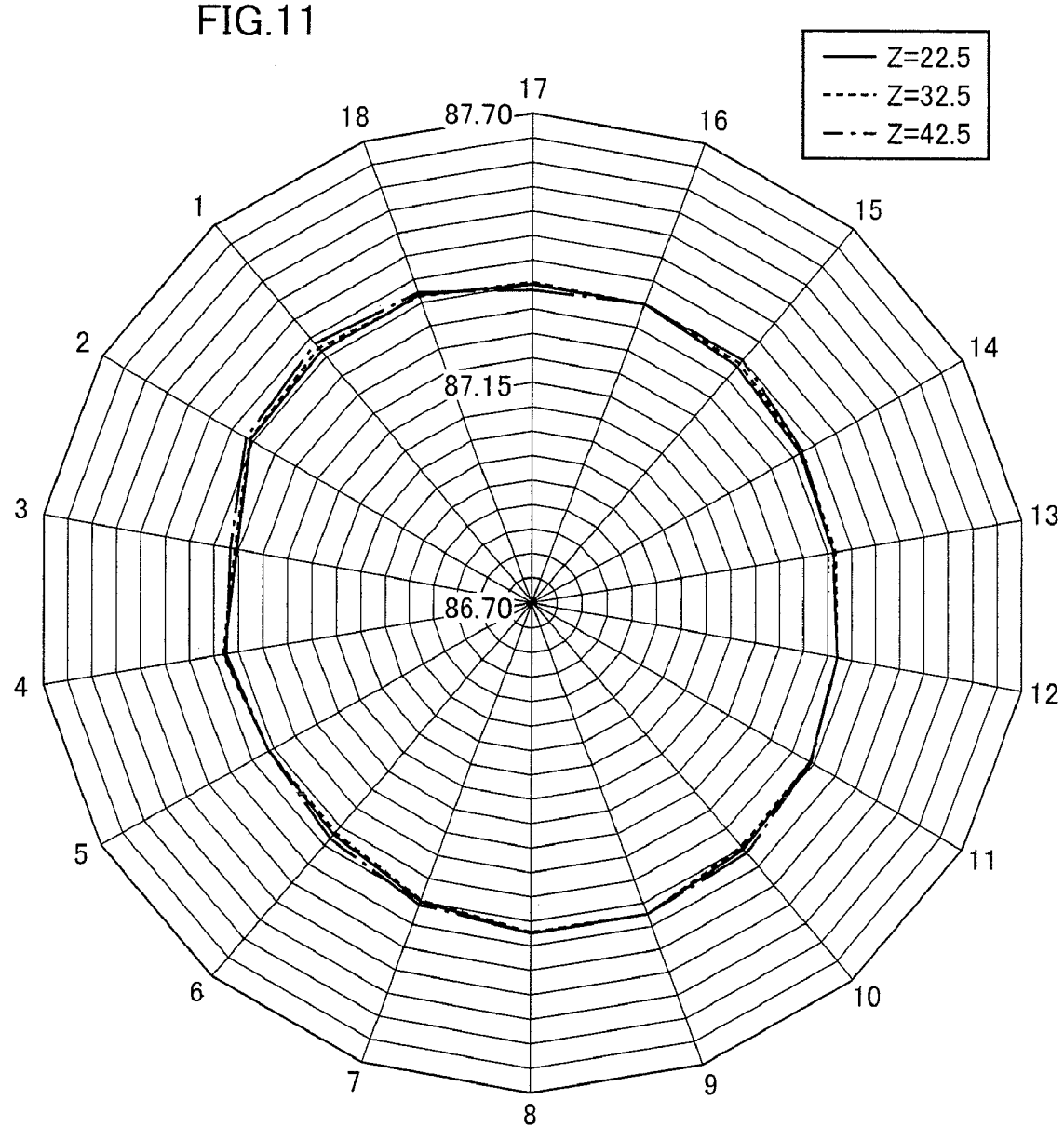
FIG. 11 is a graph showing inner diameter accuracy in the stator manufactured by a manufacturing method of a rotating electric machine according to the present embodiment.

FIG. 10 is a graph showing inner diameter accuracy in a stator of a comparative example. The stator of the comparative example is manufactured by annularly arranging split stator cores 140 around a columnar metal mold having an outer diameter equal to an inner diameter of stator 130 and then shrink fitting fastening member 145. FIG. 11 is a graph showing inner diameter accuracy in stator 130 manufactured by the manufacturing method of the rotating electric machine according to the first embodiment.

The rotating electric machine according to the comparative example in FIG. 10 and the rotating electric machine according to the first embodiment shown in FIG. 11 are rotating electric machines having a set radius of the stator of 87.35 mm.

In FIGS. 10 and 11, respective vertexes of an octadecagon represent split stator cores forming the stator. In other words, in each rotating electric machine shown in FIGS. 10 and 11, the stator is made up of 18 split stator cores. Distances from a central portion of the octadecagon to the vertexes of the octadecagon represent distances from central axis P to end faces 146 of respective split stator cores 140. Tick marks in shapes of octadecagons are drawn at equal intervals from the center of the octadecagon and distances between respective tick marks are 0.05 mm.

In FIG. 10, a central point of the octadecagon represents 86.60 mm, the outermost octadecagon represents 87.60 mm, and the marks starting from the central point respectively represent 86.60 mm, 86.65 mm, 86.70 mm, 86.75 mm, 86.80 mm, 86.85 mm, 86.90 mm, 86.95 mm, 87.00 mm, 87.05 mm, 87.10 mm, 87.15 mm, 87.20 mm, 87.25 mm, 87.30 mm, 87.35 mm, 87.40 mm, 87.45 mm, 87.50 mm, 87.55 mm, and 87.60 mm in order. In FIG. 11, a central point of the octadecagon represents 86.70 mm and the outermost octadecagon represents 87.70 mm. Specifically, the marks starting from the central point respectively represent 86.70 mm, 86.75 mm, 86.80 mm, 86.85 mm, 86.90 mm, 86.95 mm, 87.00 mm, 87.05 mm, 87.10 mm, 87.15 mm, 87.20 mm, 87.25 mm, 87.30 mm, 87.35 mm, 87.40 mm, 87.45 mm, 87.50 mm, 87.55 mm, 87.60 mm, 87.65 mm, and 87.70 mm in order.

Furthermore, each of FIGS. 10 and 11 shows distances to central axis P from portions of respective end faces 146 at heights (Z) in the direction of central axis P, 22.5 mm (shown in solid lines in FIGS. 10 and 11), 32.5 mm (shown in broken lines in FIGS. 10 and 11), and 42.5 mm (shown in one-dot chain lines in FIGS. 10 and 11).

While roundness is 0.6 in the rotating electric machine of the comparative example shown in FIG. 10, roundness is 0.07 in the rotating electric machine according to the first embodiment shown in FIG. 11.

Moreover, it is apparent that variations in the distances from the heights 22.5 mm, 32.5 mm, and 42.5 mm in the direction of central axis P to central axis P shown in FIG. 11 are smaller than variations in the distances from the heights 22.5 mm, 32.5 mm, and 42.5 mm in the direction of central axis P to central axis P shown in FIG. 10.

In other words, the rotating electric machine according to the first embodiment shown in FIG. 11 has smaller roundness and cylindricity than the rotating electric machine of the comparative example shown in FIG. 10 and has higher inner diameter accuracy.

Second Embodiment

Figure 12:
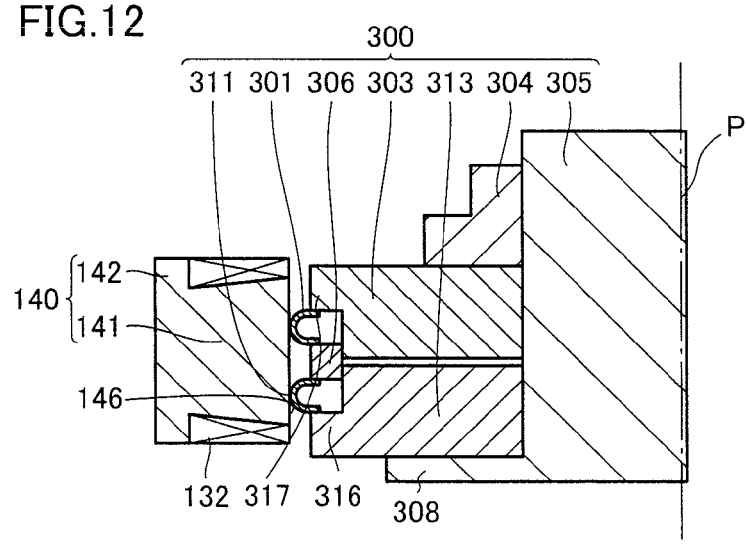
FIG. 12 is a sectional view showing a first step of a manufacturing process of a stator.
Figure 13:
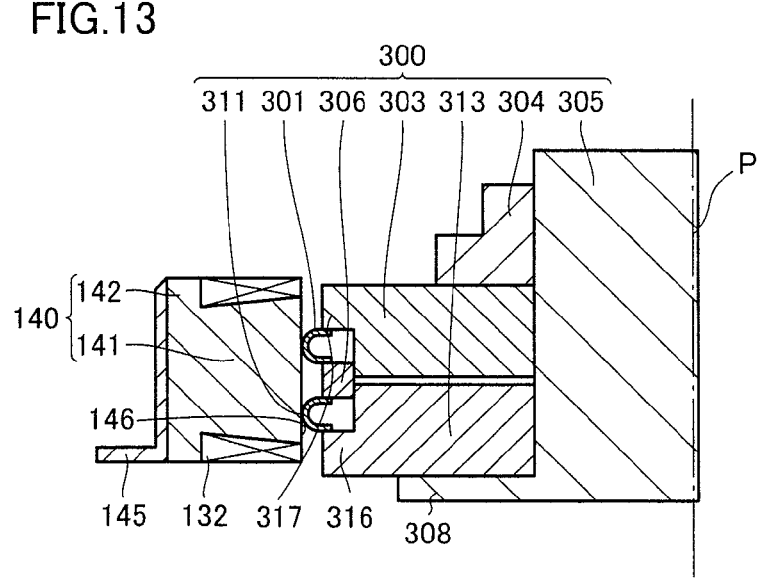
FIG. 13 is a sectional view showing a second step of the manufacturing process of the stator after the step shown in FIG. 12.
Figure 14:
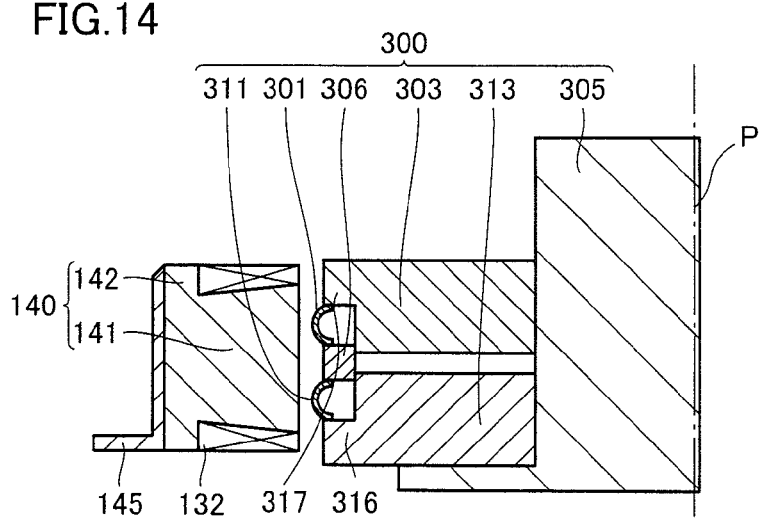
FIG. 14 is a sectional view showing a third step of the manufacturing process of the stator after the step shown in FIG. 13.

With reference to FIGS. 12 to 14, a manufacturing method of a rotating electric machine according to a second embodiment of the present invention will be described. Structures similar or corresponding to those shown in FIGS. 1 to 9 may be provided with similar reference numerals and may not be described in some cases.

FIG. 12 is a sectional view showing a first step of a manufacturing process of a stator 130. As shown in FIG. 12, a metal mold 300 includes a support member 305 formed in a columnar shape, displacement members 304 capable of being displaced in a direction of central axis P of support member 305, and pressing members 303 and pressing members 313 provided in positions adjacent to displacement members 304 in the direction of central axis P.

Moreover, metal mold 300 includes engagement members 306, pressing springs 301, and pressing springs 311 provided on an outer periphery side of pressing members 303 and pressing members 313.

A support plate 318 jutting radially outward is formed on the peripheral face of support member 305 and pressing members 313 are disposed on an upper face of support plate 318. Pressing members 303 can be displaced in the direction of central axis P of support member 305 with respect to pressing members 313.

In this case, a protruding portion 317 is formed on an upper end portion side of a radially outer peripheral face of each pressing member 303 and a protruding portion 316 is formed on a lower end portion side of a radially outer peripheral face of each pressing member 313.

Engagement member 306 is formed between protruding portion 317 and protruding portion 316 and can be displaced in the direction of central axis P. Pressing spring 301 is in a plate shape and has one end portion engaged with engagement member 306 and the other end portion engaged with protruding portion 317. Pressing spring 311 is in a plate shape and has one end portion engaged with engagement member 306 and the other end portion engaged with protruding portion 316. Each of pressing spring 301 and pressing spring 311 can be bent radially outward when it is pressed in the direction of central axis P and returns to a flat plate shape when it is released from the pressing force from outside.

Each pressing spring 301 and each pressing spring 311 are arranged in the direction of central axis P and multiple pressing springs 301 and multiple pressing springs 311 are arranged at intervals in a circumferential direction of support member 305.

If pressing member 303 and pressing member 313 are away from each other in the direction of central axis P, pressing spring 301 and pressing spring 311 are hardly bent and are in flat face shapes. If displacement member 304 displaces pressing member 303 toward pressing member 313 against biasing forces from pressing spring 301 and pressing spring 311, intervals between engagement member 306 and protruding portion 317 and between engagement member 306 and protruding portion 316 are narrowed. As a result, pressing spring 301 and pressing spring 311 are curved to bulge outward in a radial direction of support member 305.

To manufacture stator 130 by using such metal mold 300, displacement members 304 first displace pressing members 303 toward pressing members 313. As a result, pressing springs 301 and pressing springs 311 are curved to bulge outward in the radial direction of support member 305. In this case, radially outer end portion of each pressing spring 301 and each pressing spring 311 are arranged in the direction of central axis P and radially outer end portions of pressing springs 301 and pressing springs 311 are arranged on imaginary circle R2 having a larger diameter than imaginary circle R1.

With pressing springs 301 and pressing springs 311 curved in this manner, end faces 146 of split stator cores 140 are brought in contact with radially outer end portions of pressing springs 301 and pressing springs 311.

If split stator cores 140 are arranged in this manner, end faces 146 of respective split stator cores 140 are arranged on imaginary circle R2 and arranged annularly at equal intervals. Alternatively, respective split stator cores 140 may be arranged so that respective end faces 146 are arranged on imaginary circle R2, metal mold 300 may be inserted radially inside annularly disposed split stator cores 140, and pressing springs 301 and pressing springs 311 may be curved to support respective end faces 146.

FIG. 13 is a sectional view showing a second step of the manufacturing process of the stator after the step shown in FIG. 12. As shown in FIG. 13, a fastening member 145 is shrink fitted or press fitted on an outer periphery of split stator cores 140 supported by pressing springs 301 and pressing springs 311 and disposed annularly at equal intervals.

As a result, respective split stator cores 140 are uniformly pressed inward in the radial direction of support member 305 and end faces 146 of respective split stator cores 140 are supported by pressing springs 301 and pressing springs 311.

With respective split stator cores 140 supported by pressing springs 301 and pressing springs 311 in this manner, displacement members 304 are displaced upward. As a result, distances between protruding portions 316 and engagement members 306 and distances between protruding portions 317 and engagement members 306 are widened, radiuses of curvature of pressing springs 301 and 311 increase, and shapes of pressing springs 301 and 311 approximate flat plate shapes. Pressing springs 301 and pressing springs 311 have the same elastic coefficient and dimensions and are deformed similarly.

In this manner, radially outer end portions of respective pressing springs 301 and pressing springs 311 approach imaginary circle R1, amounts of radially outward bulging of pressing springs 301 and pressing springs 311 are reduced, and end faces 146 of respective split stator cores 140 are displaced toward imaginary circle R1.

At this time, because intervals are formed between adjacent split stator cores 140 in the second embodiment as well, contact between split stator cores 140 is suppressed in the radially inward displacement of split stator cores 140. When end faces 146 reach imaginary circle R1, side faces 147 positioned in the circumferential direction of respective stator teeth 141 come in contact with each other to fix respective split stator cores 140.

Therefore, the contact between split stator cores 140 suppresses problems such as dislocation of any split stator cores 140. In this case, pressing springs 301 are away from the pressing springs 311 in the direction of central axis P and portions of radially outer end portions of curved pressing springs 311 supporting end faces 146 and portions of radially outward end portions of pressing springs 311 supporting end faces 146 are away from each other in the direction of central axis P. By displacing respective split stator cores 140 inward in the radial direction while supporting portions of end faces 146 away from each other in the direction of central axis P in this manner, it is possible to suppress inclination of respective end faces 146 in such directions that they intersect central axis P. In this way, it is possible to obtain cylindricity of stator 130 thus formed.

FIG. 14 is a sectional view showing a third step of the manufacturing process of the stator after the step shown in FIG. 13. As shown in FIG. 14, as a result of further upward displacement of displacement members 304, the end portions of pressing springs 301 and pressing springs 311 move away from end faces 146 and stator 130 thus formed is detached.

As described above, by the manufacturing method of the rotating electric machine according to the second embodiment, it is possible to obtain the stator with high inner diameter roundness and cylindricity.

Third Embodiment

Figure 15:
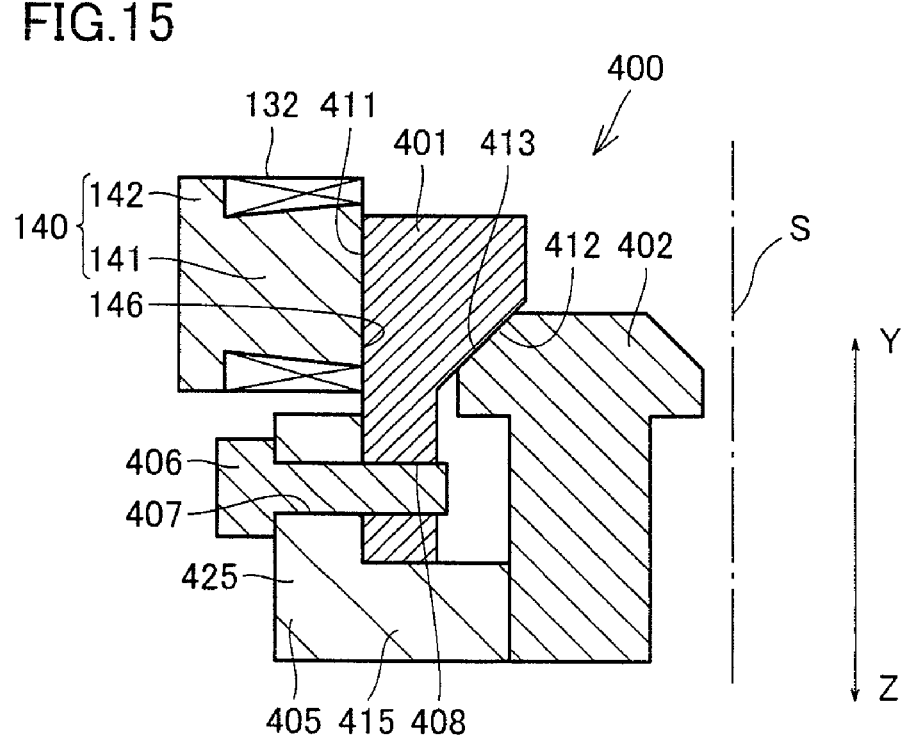
FIG. 15 is a sectional view showing a first step of a manufacturing process of a stator.
Figure 16:
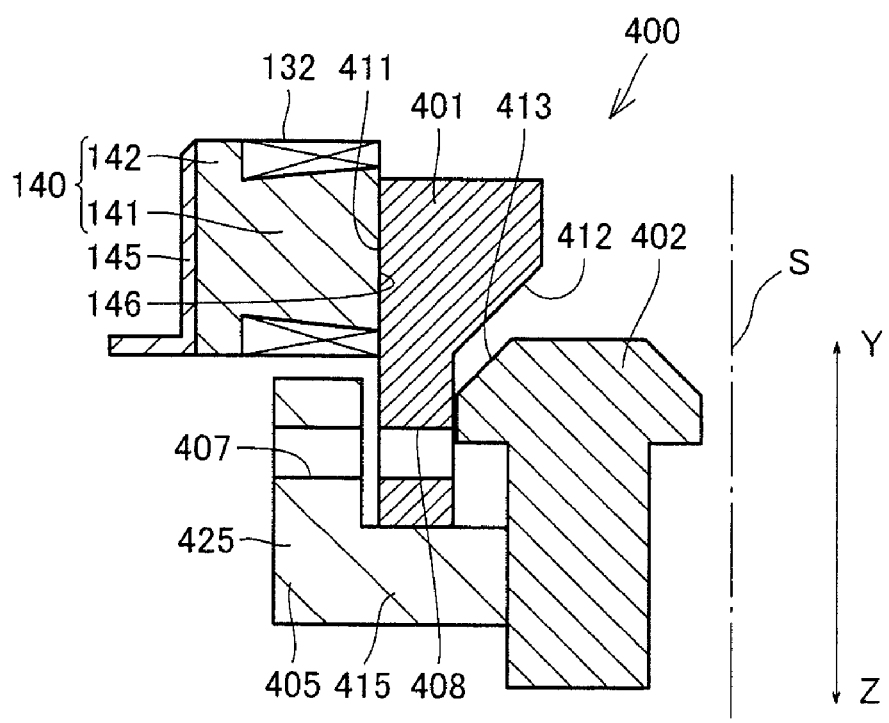
FIG. 16 is a sectional view showing a second step of the manufacturing process of the stator after the step shown in FIG. 15.

With reference to FIGS. 15 and 16, a manufacturing method of a rotating electric machine according to a third embodiment of the present invention will be described. Structures similar or corresponding to those shown in FIGS. 1 to 9 and FIGS. 11 to 14 may be provided with similar reference numerals and may not be described.

FIG. 15 is a sectional view showing a first step of a manufacturing process of a stator. As shown in FIG. 15, a metal mold 400 includes inner diameter retaining portions 401 for supporting end faces 146 of stator teeth 141, pressing members 402 for pressing and supporting inner diameter retaining portions 401 from inside in a radial direction, and a base 405.

Base 405 is formed in an annular shape around a center line S and includes a support portion 415 extending in the radial direction and a rising wall 425 formed at an outer peripheral edge portion of support portion 415 and rising in a direction of center line S.

Rising wall 425 extends in a circumferential direction and a plurality of through holes 407 disposed at equal intervals in the circumferential direction are formed in rising wall 425.

In this case, in a state shown in FIG. 15, respective inner diameter retaining portions 401 are fixed by bolts 406 inserted through holes 407 and bolts 406 are screwed into screw holes 408 formed in inner diameter retaining portions 401. As a result, inner diameter retaining portions 401 are arranged at equal intervals and annularly around center line S. If inner diameter retaining portions 401 are released from fastening by bolts 406, inner diameter retaining portions 401 are supported in such a manner that they can be displaced radially on support portion 415.

Peripheral faces of inner diameter retaining portions 401 positioned radially outside are formed as support end faces 411 curved into shapes corresponding to end faces 146 of split stator cores 140 and capable of supporting substantially the entire faces of end faces 146. Because respective inner diameter retaining portions 401 are pressed against rising wall 425 by bolts 406, support end faces 411 of respective inner diameter retaining portions 401 are arranged on imaginary circle R2.

Furthermore, upper end portions of inner diameter retaining portions 401 are jutting radially inward and peripheral faces of the upper end portions positioned radially inside are formed as inclined faces 412 inclined toward a radial outside of base 405 as they extend in the direction of arrow Z.

Pressing members 402 are disposed radially inside respective inner diameter retaining portions 401. Multiple pressing members 402 are arranged at intervals and annularly around center line S and a bulging portion is formed at one of tip end portions of each pressing member 402. A pressing face 413 inclined to correspond to inclined face 412 is formed at a radially outer portion of a peripheral face of the bulging portion. Pressing members 402 are supported by base 405 in such a manner that they are movable in directions of arrows Y and Z (opposite to Y).

To manufacture stator 130 by using this metal mold 400, respective inner diameter retaining portions 401 are first pressed against rising wall 425 by bolts 406. With respective support end faces 411 arranged on imaginary circle R2, end faces 146 of split stator cores 140 are brought into contact with respective support end faces 411. In this way, end faces 146 of respective split stator cores 140 are arranged on imaginary circle R2 and respective split stator cores 140 are arranged annularly at equal intervals.

FIG. 16 is a sectional view showing a second step of the manufacturing process of the stator after the step shown in FIG. 15. As shown in FIG. 16, fastening member 145 is mounted by shrink fitting or press fitting on outer periphery sides of respective split stator cores 140. As a result, respective split stator cores 140 are uniformly pressed radially inward.

In this state, bolts 406 are detached so that respective inner diameter retaining portions 401 can be displaced radially inward. At this time, respective inner diameter retaining portions 401 are supported by pressing members 402.

Then, if pressing members 402 are displaced in the direction of arrow Z, inner diameter retaining portions 401 and split stator cores 140 are displaced radially inward because inner diameter retaining portions 401 that can be displaced radially are pressed radially inward by split stator cores 140.

At this time, because split stator cores 140 adjacent to each other in the circumferential direction are arranged at intervals, contact between respective split stator cores 140 is suppressed similarly to other embodiments during the radially inward displacement of split stator cores 140. Therefore, in the third embodiment, it is possible to obtain roundness similarly to other embodiments.

Moreover, because substantially the entire face of end faces 146 of respective split stator cores 140 are supported by support end faces 411, it is possible to obtain cylindricity of the manufactured stator.

Although the embodiments of the present invention have been described above, the embodiments disclosed herein are examples in all points and should not be considered as restrictive. The scope of the invention is defined in claims and intended to include meanings equivalent to the claims and all modifications in the scope of claims. Moreover, numerical values and the like are examples and the present invention is not limited to the above-described numerical values and range.

INDUSTRIAL APPLICABILITY

The present invention is suitable for a manufacturing method of a rotating electric machine including a plurality of split stator cores and the rotating electric machine.

The invention claimed is:

1. A manufacturing method of a rotating electric machine, the method including the steps of:

preparing a plurality of split stator cores annularly arranged at intervals in a circumferential direction so that inner end portions thereof are aligned with an imaginary circle and a support member positioned inside said imaginary circle in a radial direction to support the inner end portions of said split stator cores;

mounting a fastening member on outer peripheries of said split stator cores to press said respective split stator cores inward in said radial direction; and displacing said split stator cores pressed by said fastening member inward in said radial direction while said support member is supporting said split stator cores, wherein said support member supports portions of said inner end portions including at least first areas and second areas positioned away from each other in a direction of a central axis of said imaginary circle, wherein said support member includes a first elastic member and a second elastic member, said first elastic member curves to bulge toward a radial outside of said imaginary circle to thereby be able to support the portion of each of said inner end portions where said first area is positioned, said second elastic member curves to bulge toward the radial outside of said imaginary circle to thereby be able to support the portion of each of said inner end portions where said second area is positioned, and said first elastic member and said second elastic member are deformed in such a manner that bulging amounts toward the radial outside of said imaginary circle reduce so that said split stator cores are displaced toward a radial inside of said imaginary circle while said support member is supporting said split stator cores.

2. The manufacturing method of the rotating electric machine according to claim 1, wherein an inner face of said support member in said radial direction is formed as a first inclined face inclined to be away from said central axis of said imaginary circle as the inner face extends from a first end portion side to a second end portion side of said support member positioned in the direction of said central axis, said first inclined face of said support member is supported by a movable member provided to be movable in the direction of the central axis of said imaginary circle, an outer face of said movable member in said radial direction is formed as a second inclined face for coming in contact with said first inclined face and extending along said first inclined face, and said movable member is displaced in a direction from said first end portion to the second end portion so that said split stator cores are displaced toward the radial inside of said imaginary circle while said support member is supporting said split stator cores.

3. The manufacturing method of the rotating electric machine according to claim 1, wherein said fastening member is an annular member mounted on the outer peripheries of said split stator cores by shrink fitting or press fitting.

4. The manufacturing method of the rotating electric machine according to claim 1, wherein said split stator cores are made up of powder magnetic cores.

* * * * *